United States Patent Office 3,255,222
Patented June 7, 1966

3,255,222
SILVER SALT COMPLEXES OF FATTY ACIDS
AND METHOD OF MAKING SAME
Carl Horowitz, Brooklyn, N.Y., assignor to Yardney International Corp., New York, N.Y., a corporation of New York
No Drawing. Filed Mar. 20, 1962, Ser. No. 181,186
3 Claims. (Cl. 260—414)

This invention relates to novel antimicrobial compositions of matter and to a method of making the same. It also concerns the utilization of said compositions in rendering articles, e.g. fabric, rubber goods, paper, leather, felt, etc. antimicrobial. As used herein the term antimicrobial is intended to include bactericides, bacteriostats, fungistats, fungicides, etc.

This application is a continuation-in-part of application Serial Number 147,035, filed October 23, 1961, now abandoned.

Heavy metal salts of fatty acids are well known in the prior art. These compounds are described by the general formula $(RCOO)_x Me$, wherein R is an alkyl radical, Me is a heavy metal and $x$ is the valence of the metal Me. Although some compounds of this character are known to be antimicrobial in character, they have not always been satisfactory in this regard.

It has now been found that antimicrobial metal salt complexes prepared by the reaction of a fatty acid with an oxide of an antimicrobial metal are superior to the corresponding simple salts in their antimicrobial properties. This is an unusual and unexpected result.

Many applications require the use of a solution containing the present metal salt complexes in effective concentrations. This presents a problem since only insufficient quantities of the salt can be dissolved in water or the solutions thereof are unstable. It has also been found that stable solutions of said heavy metal salt complexes and particularly silver salt complexes of higher fatty acids, containing the complex in sufficient concentrations so as to be an effective microbicide may be prepared by mixing the salt with an amine and then dissolving this composition in an oxygen containing organic solvent.

It is an object of the present invention to provide novel heavy metal salt complexes having good antimicrobial properties.

It is a further object of this invention to provide a method for preparing said novel metal salt complexes.

It is another object of the present invention to prepare and provide solutions of heavy metal salt complexes which contain said metal complex in sufficient concentrations as to function effectively as antimicrobials.

Other and more detailed objects of this invention will be apparent from the following description and claims.

Although applicant does not wish to be bound by any theory, it appears the structure of the metal salt complexes of the present invention may be described by the general formula:

(1)         $[(RCOO)_x Me]_y \cdot [RCOOH]_z$ wherein R is an aliphatic hydrocarbon radical, Me is a heavy metal, $x$ is the valence of metal, $y$ and $z$ are whole numbers from 1 to 10 and $y$ is greater than $z$. In one form of this invention, Me is a heavy metal having antimicrobial or oligodynamic properties. Among these the following may be mentioned by way of illustration: silver, gold, copper, mercury, zinc. Optimum properties have been observed with compounds of Formula 1 wherein Me is silver.

In the preferred form of this invention, the complexes are silver salt (argentic or argentous) complexes of higher fatty acid (saturated or unsaturated) containing from 5 to 30 carbon atoms in the chain and particularly 5 to 18 carbon atoms in the chain. These may be described by the general formula (2)         $[(RCOO)_x Ag]_y \cdot [RCOOH]$ wherein R is the moiety of a fatty acid having from 5 to 30 carbon atoms (preferably 5 to 18 carbon atoms); $x$ is 1 or 2, $y$ is an integer from 2 to 6. By way of illustration, the fatty acid and acid moiety of Formulas 1 and 2 may be derived from the following acids: valeric, hexanoic, heptylic, caprylic, pelargonic, capric, undecylenic, palmitic, oleic, linoleic, linolinic, stearic, nondecylic, carnaubic, melissic, etc.

In accordance with the present invention, the oxide is mixed with the appropriate acid at room temperature. Where the acid is a solid at ordinary temperatures, it is advantageous to melt the acid before reacting it with the metal oxide. The reaction is exothermic and the complexes are produced rapidly.

The relative molar proportions of the reactant employed in preparing the complex vary depending upon the product desired. Products with particularly good antimicrobial properties are prepared by employing the acid and oxide in the ratio of 1 equivalent of acid to 1 equivalent of oxide.

The complexes of the present invention are clearly and unmistakably different from the corresponding simple salts of the prior art. The differences are manifested from the respective physical properties (e.g. melting points, ionization constants) chemical analysis, and, bactericidal or bacteriostatic properties discussed in more detail below.

As mentioned above, in one aspect of this invention, stable solutions are prepared containing effective concentrations of the above described complexes. In a preferred form of this invention, the silver salt of a higher fatty acid-fatty acid complex (saturated or unsaturated) containing from 5 to 30 carbon atoms in the chain, and more particularly from 5 to 18 carbon atoms in the fatty acid, is mixed with an alkylolamine and this mixture is dissolved in an organic solvent selected from the group consisting of alcohols, ketones, aldehydes and esters of carboxylic acids. In addition, an exceptionally effective composition is formed by mixing silver hexanoate-hexanoic acid complex with mono-, di- or triethanolamine and dissolving this mixture in methanol or isopropanol.

The amine which may be mixed with the heavy metal salt complex and incorporated into the solvent system according to the present invention may also vary considerably. It may be a primary, secondary or tertiary amine which can be described by the general formula

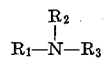

wherein $R_1$, $R_2$, $R_3$ are hydrogen, alkyl, aryl, aralkyl or hydroxyalkyl. Typical amines that may be used for this purpose include dimethyl amine, diethyl amine, methyl amine, methyl ethyl amine, di-isopropyl amine, dibenzyl amine, diphenylamine. Exceptionally good results are obtained with alkylolamines which include the mono-, di- and trialkylolamines. These may be described by the general formula

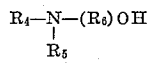

wherein $R_6$ is a divalent alkylene radical containing up to 8 carbon atoms in the alkylene chain and $R_4$ and $R_5$ are selected from the group consisting of hydrogen and the radical —$(R_6)OH$.

In a preferred form of this invention, the metal salt complex is first dissolved in the amine after which the solution is diluted with the oxygen containing organic solvent. For this purpose a solution of from 1% to 25% of metal salt complex in amine is first prepared.

The oxygen containing organic solvents which are employed in this invention may also vary considerably. These include the alcohols, particularly the aliphatic alcohols, ketones, aldehydes, esters, etc. By way of illustration, the oxygen containing organic solvents that are useful include methyl alcohol, ethyl alcohol, isopropyl alcohol, butyl alcohol, isobutyl alcohol, sec. butyl alcohol, methyl ethyl ketone, acetone, acetaldehyde, benzaldehyde butyl acetate, ethylacetate, methyl acetate, methyl propionate, ethyl formate, etc. Any quantity of solvent, compatible with the intended use of the composition is suitable.

In the preparation of the solution compositions of the present invention, a variety of procedures are applicable. However, since silver salt complexes of the fatty acids, and particularly the silver hexanoatehexanoic acid, are unstable in the amine (e.g. monoethanolamine), it is preferred that after mixing the silver salt complex with the amine, that the resulting solution is immediately diluted with the oxygen containing organic solvent.

The quantity of metal salt complex which is contained in the instant composition will vary to some extent depending on the particular requirements, the particular complex selected and the solvent system selected. In general, however, the solution will contain from about 5% by weight to 1 part per million of metal salt complex.

The following examples illustrate procedures for preparing heavy salt complexes employed in the present invention and to the microbicidal properties thereof. The method for evaluating the products involves saturating a paper disc called a "penicillin disc" with the test solution, placing the saturated disc on an agar plate, incubating the plate and measuring the zone of inhibition around the disc.

EXAMPLE 1

Take:                                          Grams
    Caproic acid _____ 116.2
    Silver oxide _____ 115.9 and mix them in a mortar until a uniform tan colored powder is obtained. There is a large evolution of heat during the reaction. The product has a melting range of from 249° C. to 254° C., and ionization constant $10^{-2}$. When incorporated in an amount of 1% into a hydrophilic ointment, it gave 4 mm. zone of inhibition against *Staphylococcus aureus* and a 4 mm. zone of inhibition against *Escherichia coli* on a streaked agar plate. The product was purified by boiling it in water and filtering. The analysis of the purified product showed a stoichiometric ratio of 4 silver atoms to 5 acid molecules.

EXAMPLE 2

Take:                                          Grams
    Caprylic acid _____ 144
    Silver oxide _____ 116 and grind them in a mortar until a uniform tan colored powder is obtained. There is some evolution of heat during the reaction. The product obtained has a melting point of 216 to 223° C. and an ionization constant of $10^{-3}$. When incorporated in an amount of 1% into a hydrophilic ointment, it gave a 6 mm. inhibition zone against *Staphylococcus aureus* and a 7 mm. inhibition zone against *Escherichia coli* when plated out on streaked agar plate. The product was purified by boiling it in excess of water to remove any unreacted caprylic acid and silver oxide. The analysis of the purified product showed a stoichiometric ratio of 5 silver atoms to 6 molecules of acid.

In Table I below, a comparison is given between the properties of the complexes of the present invention and the corresponding simple silver salts. The simple silver salts were prepared by reacting the sodium salt of the appropriate acid with silver nitrate. "Log K" is the log of the ionization constant of the various materials.

Table I

| Substance | M.P., °C. | Log K | Zone of inhib. | | Stoich. ratio |
|---|---|---|---|---|---|
| | | | Staph. a | E. coli | Ag/Acid |
| Product of Example 1 | 249–254 | −2.05 | 4 | 4 | 1:1.25 |
| Silver caproate | 155–156 | −1.65 | 1 | 1 | 1:1 |
| Product of Example 2 | 216–223 | −2.97 | 6 | 7 | 1:1.20 |
| Silver caprylate | 210 | −2.48 | 1 | 1 | 1:1 |

EXAMPLE 3

Grams
Hexanoic acid _____ 100
    and
Silver oxide _____ 100 are mixed together. Heat immediately evolves, and a straw colored waxy solid is produced. After washing with distilled water and drying, a product is obtained which has a very strong bactericidal effect. It gives zones of inhibition on agar plate inoculated with *Staphylococcus aureus* and *Escherichia coli* even in very low concentrations when diluted with water. The following table illustrates the results:

Table II

Concentration of complex:       Zone of inhibition, mm.
    $10^{-2}$ _____ 6
    $10^{-3}$ _____ 6
    $10^{-4}$ _____ 5
    $10^{-5}$ _____ 4
    $10^{-6}$ _____ 2
    $10^{-7}$ _____ 2
    $10^{-8}$ _____ 1
    Control _____ 0–

The product also shows a high fungicidal action when tested against *Aspergillus niger* and *Chaetomium globosum* and *penicillium gypseum*.

EXAMPLE 4

Grams
Undecylenic acid _____ 100
Silver oxide _____ 10 are heated gently to 100° C. whereupon a light brown colored liquid is formed which solidified upon cooling to a light brown paste. When placed directly on an inoculated agar plate a very large inhibition zone against *Escherichia coli* is obtained. When dissolved in methylene chloride at .1% concentration, an 8 mm. zone of inhibition is obtained.

This product is effective against athlete's foot.

EXAMPLE 5

Grams
Stearic acid _____ 100
Silver oxide _____ 10 are melted whereupon the silver oxide dissolves and gives a brown liquid which solidifies to a brown hard brittle solid upon cooling. When placed directly on an inoculated agar plate, it gives a very large zone of inhibition against *Escherichia coli*. When dissolved in methylene chloride to .1% concentration, an 8 mm. inhibition zone is obtained.

The product is suitable as a bactericidal additive to soap.

The following examples illustrate the preparation of compositions embodied in the present invention. It should be understood however, that the invention is not limited thereto.

EXAMPLE 6

Grams
Silver hexanoate-hexanoic acid (product of Example 1) _____ 1
Monoethanolamine _____ 10 are mixed until dissolved. This solution is diluted immediately with 90 grams methyl alcohol. The dilution should be done without waiting because the solution of silver hexanoate-hexanoic acid in monoethanolamine is unstable and becomes progressively darker with a precipitation appearing on the bottom of the container. However, once it is diluted with the alcohol, it remains stable and almost colorless at 1% concentration.

When tested bacteriologically at 1% and 0.1% dilution, the following results were obtained:

| Concentration of Silver Hexanoate-Hexanoic Acid (Product of Example 1) | Zone of Inhibition | |
|---|---|---|
| | Staph. aureus | E. coli |
| 1% | 3 | 4 |
| 0.1% | 2 | 2 |

EXAMPLE 7

The procedure of Example 6 was employed using triethanolamine in place of monoethanolamine.

EXAMPLES 8 AND 9

The procedure of Examples 6 and 7 were employed using isopropyl alcohol in place of methyl alcohol.

EXAMPLE 10

| | Grams |
|---|---|
| Silver oxide | 10 |
| Caprylic acid | 13 | are mixed together. Heat evolution takes place and a grayish white product is obtained which gives bacteriological results same as in Example 3. A solution of this salt in monoethanolamine and methyl alcohol was prepared using the quantities of materials and procedure of Example 6.

EXAMPLE 11

| | Grams |
|---|---|
| Silver oxide | 10 |
| Capric acid | 13 | are mixed together. Silver caprate-capric acid complex is obtained which gives bacteriological results as per Example 3. A solution of this salt in monoethanolamine and methyl alcohol was also prepared using the quantities of materials and the procedure of Example 6.

The bacteriological results are the same regardless of solvent.

Whereas the invention has been described with reference to specific forms thereof, it will be understood that many changes and modifications may be made without departing from the spirit of this invention.

What is claimed is:

1. A method of producing an antimicrobial composition comprising the steps of directly reacting solid silver oxide with an undiluted liquid fatty acid selected from the group which consists of caproic acid, caprylic acid, hexanoic acid, undecylenic acid, stearic acid and capric acid in a solvent-free environment, said acid being present in a molar quantity exceeding one mole of said acid per mole of silver in the silver oxide and dissolving the silver/acid product thus produced in an aqueous medium.

2. As a composition of matter, the product of claim 1.

3. A method of producing an antimicrobial composition comprising the step of directly reacting solid silver oxide with an undiluted liquid fatty acid selected from the group which consists of caproic acid, caprylic acid, hexanoic acid, undecylenic acid, stearic acid and capric acid in a solvent-free environment, said acid being present in a molar quantity exceeding one mole of said acid per mole of silver in the silver oxide.

References Cited by the Examiner

UNITED STATES PATENTS

| 2,562,488 | 7/1951 | Fuchs | 167—22 |
| 2,630,444 | 3/1953 | Fugassi et al. | 260—430 |
| 2,878,155 | 3/1959 | Cruickshank | 167—22 |
| 2,880,222 | 3/1959 | Friedheim | 260—430 |

OTHER REFERENCES

Silman: Soap, vol. 12 (1936), November, pages 36, 37, and 77; December, pages 31 to 33 and 39.

CHARLES B. PARKER, *Primary Examiner.*

JULIAN S. LEVITT, *Examiner.*